United States Patent [19]
Gelardi et al.

[11] Patent Number: 4,677,517
[45] Date of Patent: Jun. 30, 1987

[54] WIPER SPRING ASSEMBLY FOR THE FABRIC LINER OF A FLOPPY DISC

[75] Inventors: Anthony L. Gelardi, Cape Porpoise; Stephen G. Swinburne, Scarborough, both of Me.

[73] Assignee: Shape Inc., Biddeford, Me.

[21] Appl. No.: 734,599

[22] Filed: May 16, 1985

[51] Int. Cl.⁴ ............................................. G11B 23/03
[52] U.S. Cl. .................................................... 360/133
[58] Field of Search ...................... 360/128, 133, 130.3, 360/130.34, 97, 99, 135, 86

[56] References Cited

U.S. PATENT DOCUMENTS 4,417,291 11/1983 Miklos et al. ......................... 360/133
4,419,164 12/1983 Martinelli ........................ 156/244.11
4,510,546 4/1985 Asami et al. ......................... 360/133
4,532,564 7/1985 Larson et al. ........................ 360/133

FOREIGN PATENT DOCUMENTS 0045185 3/1980 Japan ..................................... 360/133

Primary Examiner—Robert S. Tupper
Assistant Examiner—Andrew L. Sniezek
Attorney, Agent, or Firm—Staas & Halsey

[57] ABSTRACT

A wiper spring attached to a ramp formed in a floppy disc jacket base, which biases against a fabric liner to force the fabric liner against the floppy disc. The wiper spring is preferably metal, such as phosphor bronze, berilium copper or stainless steel. The wiper spring is attached to the jacket base by two or more posts formed on the base which protrude through openings formed in the spring and which are peened to hold the spring in place.

18 Claims, 5 Drawing Figures

WIPER SPRING ASSEMBLY FOR THE FABRIC LINER OF A FLOPPY DISC

BACKGROUND OF THE INVENTION

The present invention relates generally to data storage media and, more particularly, to a wiper spring assembly which biases a fabric liner against a floppy disc.

Widely used in the computer industry is a data storage medium including a "floppy disc" which is coated with magnetic particles and is positioned in a protective "jacket." The jacket includes a base, a cover and a fabric liner. The floppy disc, while in use, is constantly cleaned by the wiping action of the fabric liner.

The fabric liner has to be biased upwardly against the floppy disc by some means within the jacket. This means is presently a plastic "wiper spring," usually polyester, located between the jacket base and the fabric liner and attached to a flat area of the jacket base by adhesive. This conventional wiper spring is shown in FIGS. 1 and 2 herein.

The conventional wiper spring requires that a crease be formed therein to force the floating, free end of the wiper spring up against the fabric liner, which liner in turn presses against the floppy disc. This spring action not only causes the cleaning action but also creates a drag on the floppy disc measured as torque. It is important that this torque be as constant as possible to induce rotational stability in the floppy disc and reduce the chance of harmonic vibration being created on the floppy disc.

Use of the conventional wiper spring has its drawbacks, however, because a plastic spring does not exert the desired force at a constant compressed height over an extended period of time. In addition, a plastic spring is susceptible to gage variations, as well as other material variations during the plastic manufacturing process, which are substantial enough to cause a wide variation in the force exerted by the plastic wiper spring.

In light of the above, the prior art still does not teach a wiper spring which biases the fabric liner of a floppy disc to provide the most efficient operation of the floppy disc.

SUMMARY OF THE INVENTION

Accordingly, it is an object of the present invention to provide a wiper spring assembly for a fabric liner of a floppy disc which is capable of exerting the desired force at a constant compressed height for an extended period of time against the fabric liner of a floppy disc.

It is another object of the present invention to provide a wiper spring assembly for a fabric liner of a floppy disc which eliminates the need for creasing the wiper spring, which creasing necessarily limits the effective life of the wiper spring.

It is another object of the present invention to provide a wiper spring assembly for a fabric liner of a floppy disc which is made of a material unsusceptible to wide gage variations.

To achieve the foregoing and other objects of the invention and in accordance with the purposes of the invention, there is provided a wiper spring assembly for the fabric liner of a floppy disc, wherein a flat and preferably metal, wiper spring is positioned on a ramp formed in the jacket base to bias upwardly against the fabric liner and to efficiently force the fabric line against the floppy disc. The metal is preferably phosphor bronze, berilium copper or stainless steel. The wiper spring is preferably attached to the ramp of the jacket base via two or more molded posts formed on the jacket base that protrude through corresponding holes formed in the wiper spring and are peened to hold the wiper spring in place.

The assembly of the present invention provides for a more constant force exertion over a longer period of time than the conventional, creased, plastic wiper spring.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
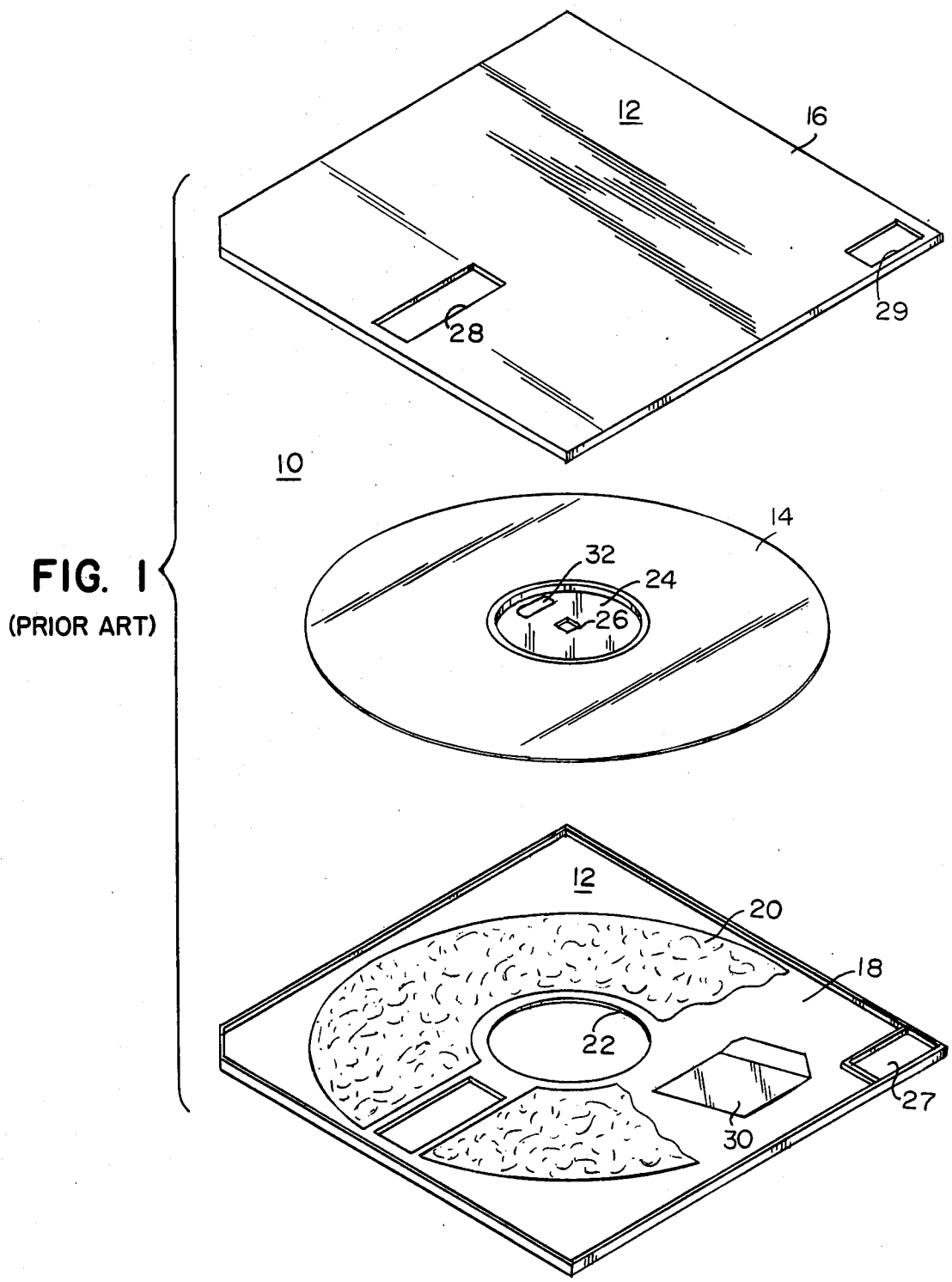
FIG. 1 is an exploded, perspective view of a conventional data storage medium in the form of a floppy disc jacket enclosing a floppy disc.

FIG. 1 illustrates a conventional data storage medium indicated by the reference numeral 10, which generally includes a floppy disc jacket 12 and a circular floppy disc 14.

The floppy disc jacket 12, into which the circular floppy disc 14 is inserted and sealed, includes a cover 16 and a base 18. The base 18 includes a fabric liner 20 mechanically attached thereto. The fabric liner 20 is a layer of porous, fibrous, low-friction, material.

The jacket base 18 has a circular opening 22 located at its center which is slightly larger in diameter than a circular member 24 positioned at the center of the floppy disc 14. The circular member 24 includes a small square opening 26 at the center thereof, and a rectangular opening 31 off center. When installed in a device adapted for recording and/or reproducing information on the floppy disc 14, a means for centering the floppy disc 14 passes through the square opening 26, and a means for rotating the floppy disc 14 passes through a rectangular hole 32 thereby engaging the floppy disc 14 and rotating it about its center. When information is to be recorded or reproduced from the floppy disc 14, a transducing means is inserted through a rectangular opening 28 formed in the jacket cover 16 and contacts the surface of the floppy disc 14.

The jacket base 18 also includes a write/protect tab pocket 27 for receiving a write/protect tab (not shown), which is accessed through an opening 29 formed in the jacket cover 16.

Figure 2:
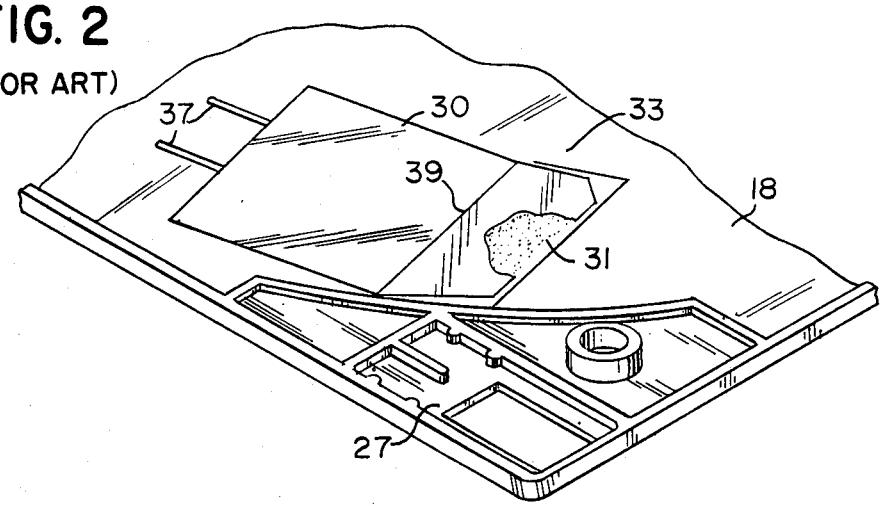
FIG. 2 is a detailed perspective view of a prior art wiper spring, illustrating particularly the attachment of the conventional, creased, plastic wiper spring to the jacket base via adhesive.

The medium 10 also includes a creased polyester wiper spring 30. More particularly, FIG. 2 is a detailed view of the conventional wiper spring 30, illustrating attachment thereof to a flat area 33 of the jacket base 18 having parallel ribs 37 via adhesive 31. As can be seen, the wiper spring 30 requires a crease 39 therein to create bias.

Figure 3:
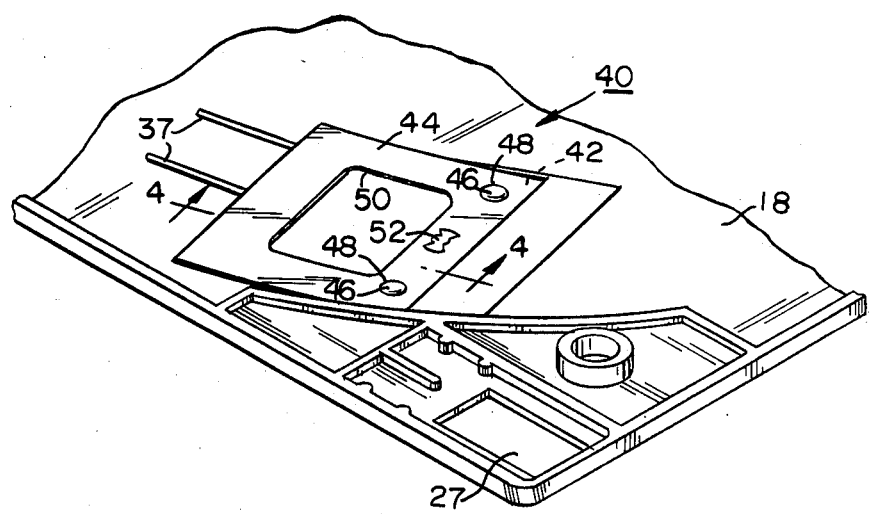
FIG. 3 is a perspective view of the wiper spring assembly according to the present invention, illustrating particularly attachment of the wiper spring to the jacket base via peened posts.

In contrast to the conventional wiper spring 30 shown in FIGS. 1 and 2, FIG. 3 illustrates the wiper spring assembly 40 according to the present invention. The wiper spring assembly 40 does not require a crease to create the required angle for bias. Instead, a ramp 42 is molded into the jacket base 18 (see FIG. 4) and a flat wiper spring 44 is attached to this ramp 42. The ramp 42 can be used with either the metal or plastic embodiments of the wiper spring 44 described below, since the ramp 42 produces beneficial results with either embodiment.

Overall, this wiper spring assembly 40 eliminates the variable that is a result of the conventional attempt to create a precision crease and having this crease remain stable over the life of the product.

Figure 4:
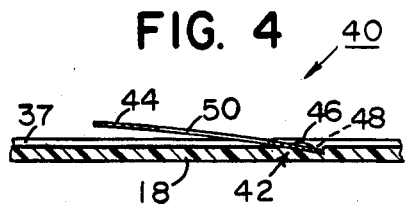
FIG. 4 is a side, cross-sectional view of the wiper spring assembly according to the present invention, illustrating particularly, orientation of the wiper spring on the ramp formed in the jacket base.

FIG. 4 best illustrates in detail how the wiper spring 44 is attached to the ramp 42 formed on the jacket base 18. Attachment is preferably accomplished via two or more posts 46 formed on the jacket base 18 which receive corresponding openings 48 formed in the wiper spring 44. The posts 46 are then peened to a size greater than the size of the recesses 48 to hold the wiper spring 44 in position relative to the jacket base 18. As an alternative form of attachment, adhesive can be used.

Figure 5:
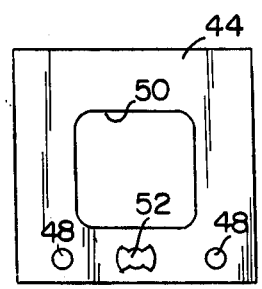
FIG. 5 is a top plan view of the wiper spring shown in FIGS. 3 and 4.

FIG. 5 is a detailed, plan view of the wiper spring 44 of the present invention. As can be seen, the wiper spring is rectangular and includes a rectangular opening or "window" 50 formed centrally thereof, the circular openings 48 for receiving the posts 46 and a locking cut out 52, which is used for handling the wiper spring 44 during assembly.

The wiper spring 44 attached to the ramp 42 can be made of either metal or plastic, although metal is preferred for the following reason. There is a torque that is considered ideal to accomplish the cleaning action and to provide a stabilizing force against any harmonic vibrations that may be created in the floppy disc 14 during rotation. There is a substantial difference in the reduction of torque over time that favors a wiper spring 44 made of metal over a wiper spring 30 made of plastic.

Accordingly, the present invention prefers a metal wiper spring 44 to a plastic wiper spring 30. Phosphor bronze, berilium copper, stainless steel, and several other metal materials are the preferred metals. The characteristics of these metals are such that the force exerted over extended periods of time is more constant than is the case with plastic.

In comparison with the conventional, creased, plastic spring 30, a major benefit of the wiper spring 44 is the ability to intentionally vary the torque ratings by changing the window 52 size in the wiper spring 44. With the conventional, plastic, wiper spring 30 the torque cannot be increased above 25 gm/cm., by increasing the crease 39 in the wiper spring 30, increasing the thickness, or both, and still maintain the narrow band of torque readings that are maintained with the wiper spring 44 of the present invention.

In addition, placement of the wiper spring 44 on the jacket base 18 is also critical. With the molded posts 46, peening is used to keep the wiper spring 44 in place. Placement accuracy is thereby guaranteed. With the conventional, creased, plastic, wiper spring 30 attached by adhesive, accurate placement is close to impossible.

Another benefit of the present invention is that the pricing of the wiper spring 44 is actually lower than the overall cost of the conventional, creased, plastic, wiper spring 30 because of the greater amount of secondary processing required for the plastic wiper spring 30 to prepare it for assembly.

Overall, the wiper spring assembly 40 according to the present invention substantially improves the reliability of the floppy disc 14 over the expected life of the product.

The foregoing is considered as illustrative only of the principles of the invention. For example, although the embodiments described herein indicate that the wiper spring 44 should be attached to the jacket base 18, it is to be understood that in light of the fact that floppy discs are available in double magnetic-sided versions, a wiper spring 44 can be used on either or both the floppy disc jacket cover and base. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims and their equivalents.

What is claimed is:

1. A wiper spring assembly for the fabric liner of a floppy disc cassette which includes a first, substantially planar half of a floppy disc jacket, a fabric liner attached to the first half of the floppy disc jacket and a floppy disc located on the fabric liner, said assembly comprising: a flat wiper spring attached to an inclined ramp formed in and at an angle with respect to the first half of the floppy disc jacket, said inclined ramp causes the flat wiper spring to bias against the fabric liner to urge part of the fabric liner against the floppy disc and clean the floppy disc.

2. The assembly as recited in claim 1, wherein the wiper spring is metal.

3. The assembly as recited in claim 2, wherein the wiper spring is attached by posts formed on the first half of the floppy disc jacket, each of which extends through a corresponding opening formed in the wiper spring and is peened to a size greater than the size of the opening.

4. The assembly as recited in claim 3, wherein the metal is phosphor bronze.

5. The assembly as recited in claim 3, wherein the metal is berilium copper.

6. The assembly as recited in claim 3, wherein the metal is stainless steel.

7. The assembly as recited in claim 2, wherein the wiper spring is attached by adhesive.

8. The assembly as recited in claim 7, wherein the metal is phosphor bronze.

9. The assembly as recited in claim 7, wherein the metal is berilium copper.

10. The assembly as recited in claim 7, wherein the metal is stainless steel.

11. The assembly as recited in claim 1, further comprising a window formed in the wiper spring,
   wherein an amount of force exerted by the wiper spring against the fabric liner can be varied depending upon the size of the window.

12. A wiper spring assembly for the fabric liner of a floppy disc cassette, comprising:

(a) a floppy disc jacket base;
(b) a floppy disc jacket cover;
(c) a floppy disc positioned between the base and the cover;
(d) a fabric liner positioned between the floppy disc and the base; and
(e) a flat metal wiper spring attached to an inclined ramp formed in and at an angle with respect to the base by at least two posts formed on the base, each of which extends through a corresponding opening formed in the metal spring and is peened to a size greater than the size of the corresponding opening, such that said inclined ramp causes the wiper spring to bias against the fabric liner to urge part of the fabric liner against the flopy disc and clean the floppy disc.

13. The assembly as recited in claim 12, further comprising a window formed in the metal wiper spring,
wherein an amount of force exerted on the fabric liner can be varied depending upon the size of the window.

14. A floppy disc cassette, comprising:
(a) a floppy disc jacket base;
(b) a floppy disc jacket cover;
(c) a floppy disc positioned between the base and the cover;
(d) a fabric liner positioned between the floppy disc and the base; and
(e) a flat wiper spring attached to an inclined ramp formed in and at an angle with respect to the base such that said inclined ramp causes the wiper spring to bias against the fabric liner to urge part of the fabric liner against the floppy disc and clean the floppy disc.

15. The cassette as recited in claim 14, further comprising a window formed in the wiper spring,
wherein the amount of force exerted by the wiper spring against the fabric liner can be varied depending upon the size of the window.

16. The cassette as recited in claim 14, wherein the wiper spring is metal.

17. The cassette as recited in claim 14, wherein the wiper spring is plastic.

18. The cassette as recited in claim 1, wherein the wiper spring is plastic.

* * * * *